(12) United States Patent
Chinnaswamy et al.

(10) Patent No.: US 8,243,602 B2
(45) Date of Patent: Aug. 14, 2012

(54) DYNAMICALLY CONFIGURING ATTRIBUTES OF A PARENT CIRCUIT ON A NETWORK ELEMENT

(75) Inventors: Sudhagar Chinnaswamy, San Jose, CA (US); Timothy J. Lynch, San Francisco, CA (US); Lars A. Martin, Vancouver (CA); Sudhakar Chunduru, Fremont, CA (US); Samvid S. Shah, San Jose, CA (US); Sunny Y. Wang, Saratoga, CA (US); Srikanth Chavali, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 449 days.

(21) Appl. No.: 12/512,928

(22) Filed: Jul. 30, 2009

(65) Prior Publication Data

US 2010/0303092 A1 Dec. 2, 2010

Related U.S. Application Data

(60) Provisional application No. 61/182,713, filed on May 30, 2009, provisional application No. 61/183,073, filed on Jun. 1, 2009.

(51) Int. Cl.
*H04L 12/28* (2006.01)
*H04L 12/56* (2006.01)

(52) U.S. Cl. .................. 370/235; 370/252; 370/401

(58) Field of Classification Search ................ None
See application file for complete search history.

(56) References Cited

U.S. PATENT DOCUMENTS

2008/0022392 A1    1/2008  Karpati et al.
2008/0069018 A1*   3/2008  Gast ............................. 370/310
2010/0188976 A1*   7/2010  Rahman et al. ............... 370/235

OTHER PUBLICATIONS

IP Services and Security Configuration Guide, SmartEdge OS, 2007, 972 pgs., Release 6.1.1, Part No. 220-0754-01, Redback Networks Inc., San Jose, California.
IP Services and Security Operations Guide, SmartEdge OS, 2007, 444 pgs., Release 6.1.1, Part No. 220-0755-01, Redback Networks Inc., San Jose, California.
International Search Report and Written Opinion, Application No. PCT/IB2010/052399, dated Nov. 18, 2010, 14 pages.
Anonymous, "Define Interface Policy-Map AV Pairs AAA," 2006, pp. 1-18, Cisco Systems, Inc., downloaded from http://www.cisco.com/en/US/docs/ios/12_3/12_3x/12_3xi/feature/guide/123XIQoS.pdf.
S. G. Selvakumar et al., "Policy Based Service Provisioning System for WiMAX Network: An Approach," Signal Processing, ICSCN '08 International Conference on Communications and Networking, Jan. 1, 2008, IEEE, pp. 177-181.

* cited by examiner

*Primary Examiner* — Marcus R Smith
(74) *Attorney, Agent, or Firm* — Blakely Sokoloff Taylor & Zafman, LLP

(57) ABSTRACT

Methods and apparatus for dynamically configuring a parent circuit through a subscriber record on an authentication, authorization, and accounting (AAA) server responsive to an authorization event for the subscriber session on the network element. According to one embodiment of the invention, the AAA server accesses the subscriber record for a subscriber session on the network element. Based on this subscriber record, a set of one or more attributes for a subscriber circuit and a set of one or more attributes for a parent circuit of the subscriber circuit are determined. The network element applies the set of subscriber circuit attributes to the subscriber circuit and the set of parent circuit attributes to the parent circuit.

20 Claims, 2 Drawing Sheets

DYNAMICALLY CONFIGURING ATTRIBUTES OF A PARENT CIRCUIT ON A NETWORK ELEMENT

CROSS-REFERENCE TO RELATED APPLICATIONS

This application claims the benefit of U.S. Provisional Application No. 61/183,073, filed Jun. 1, 2009, and U.S. Provisional Application No. 61/182,713, filed May 30, 2009, which are hereby incorporated by reference.

BACKGROUND

1. Field

Embodiments of the invention relate to the field of networking; and more specifically, to configuring attributes of circuits on network elements.

2. Background

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber end stations (e.g., servers, workstations, laptops, palm tops, mobile phones, smartphones, multimedia phones, voice over internet protocol (VOIP) phones, portable media players, GPS units, gaming systems, set-top boxes, etc.) access content/services provided over the Internet and/or content/services provided on virtual private networks (VPNs) overlaid on the Internet, intranets and/or other private networks. The content and/or services are typically provided by one or more end stations (e.g., server end stations belonging to a service or content provider, or end stations participating in a peer to peer service), and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements to other edge network elements) to the other end stations (e.g., server end stations).

Certain network elements (e.g., certain edge network elements) internally represent subscriber end stations (or sometimes customer premise equipment (CPE), such as a residential gateway (e.g., a router, modem)) and the network segments and elements used to provide access network connectivity to those end stations to themselves with a hierarchy of circuits. The leaf nodes of the hierarchy of circuits are subscriber circuits. Each of the subscriber circuits uniquely identifies within the network element a subscriber session at any given time. A subscriber session represents a unique stream of packets that is received from and sent to a subscriber end station and is identified by factors such as the physical interface and a unique combination of protocol encapsulations, addresses, VLAN, and session identifiers marked in those packet's headers. The subscriber circuits have parent circuits in the hierarchy that typically represent aggregations of multiple subscriber circuits. For example, a VLAN on one of the networks element's interfaces that encapsulates all of the traffic sent or received for a particular set of subscriber end stations whose traffic shares a common physical link on the access network.

Provisioning of parent circuits is applied directly to the individual network elements through mechanisms such as a command line interface (CLI) or a proprietary, vendor-specific graphical user interface (GUI) console. For instance, a CLI would be used to provision a VLAN's identifier, encaps, binding, access control list, and quality of service (QoS) rate enforcement. This type of provisioning is referred to as static provisioning or static configuring.

SUMMARY

Methods and apparatus for dynamically configuring a parent circuit through a subscriber record on an authentication, authorization, and accounting (AAA) server responsive to an authorization event for the subscriber session on the network element are described. According to one embodiment of the invention, the AAA server accesses the subscriber record for a subscriber session on the network element. Based on this subscriber record, a set of one or more attributes for a subscriber circuit and a set of one or more attributes for a parent circuit of the subscriber circuit are determined. The network element applies the set of subscriber circuit attributes to the subscriber circuit and the set of parent circuit attributes to the parent circuit.

According to another embodiment of the invention, a network element, to be coupled to an authentication, authorization, and accounting (AAA) server, supports broadband remote access server (B-RAS) capabilities. The network element includes a set of one or more ports to receive subscriber sessions, wherein each subscriber session represents a distinguishable flow of packets being communicated between the network element and a subscriber end station (or sometimes customer premise equipment (CPE)) using a protocol. The network element also includes a plurality of control modules to receive from the AAA server, for each of a plurality of subscriber sessions, a set of one or more subscriber circuit attributes and a set of one or more parent circuit attributes both based on a subscriber record stored in the AAA server for that subscriber session. The control modules are also to apply the set of subscriber circuit attributes to a subscriber circuit for that subscriber session, and apply the set of parent circuit attributes to a parent circuit for the subscriber circuit.

This is advantageous because the sets of parent circuit attributes for the parent circuits may be dynamically configured through the subscriber circuits' subscriber records on the AAA server responsive to authorization events for the subscriber sessions.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for dynamically configuring a parent circuit through a subscriber record on an AAA server responsive to an authorization event for the subscriber session on the network element. In the following description, numerous specific details such resource partitioning/sharing/duplication implementations, types and interrelationships of system components, and integration choices are set forth in order to provide a more thorough understanding of the present invention. However, one skilled in the art will appreciate that the invention may be practiced without such specific details. In other instances, control structures, hardware, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
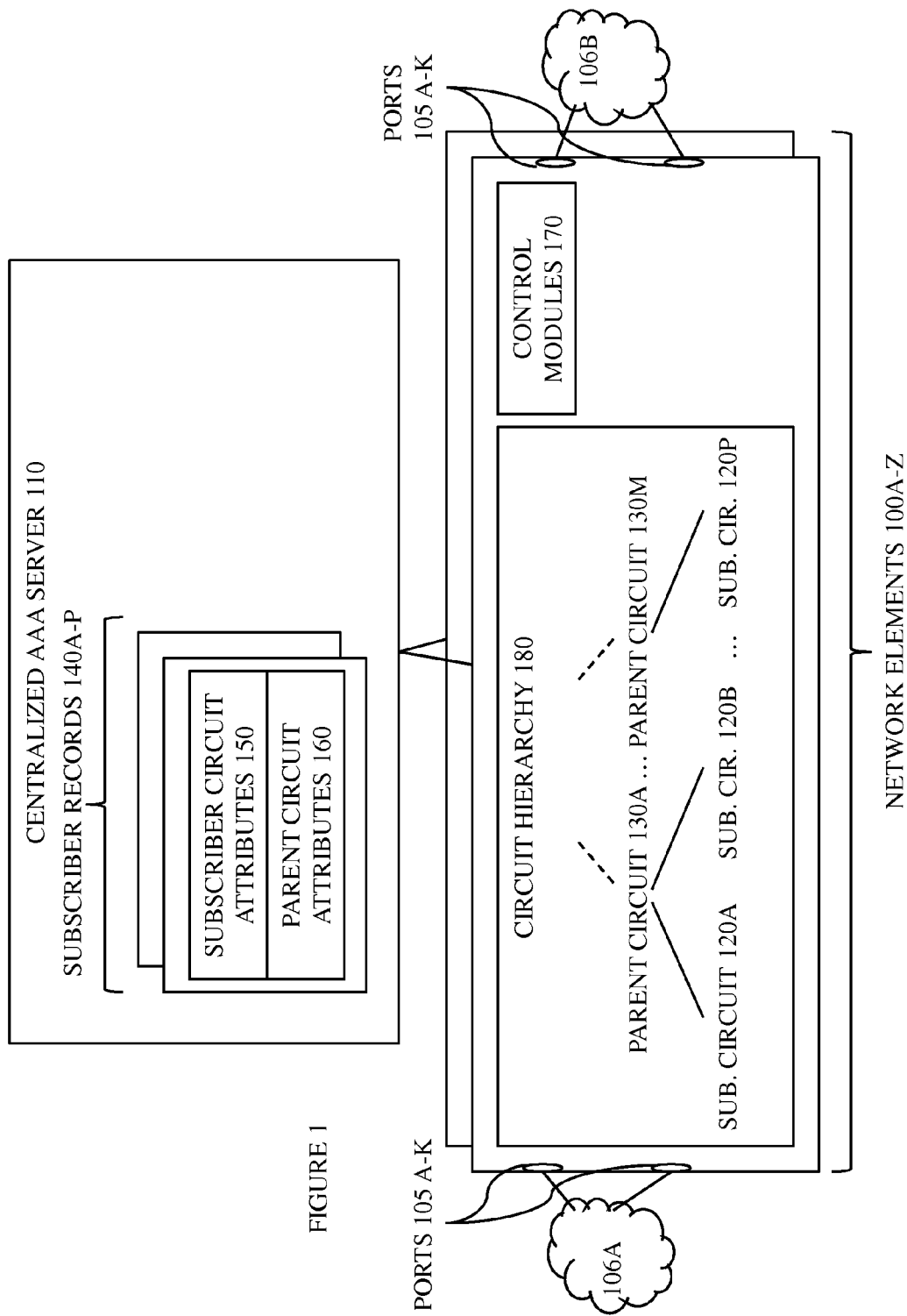
FIG. 1 is a block diagram of a network according to one embodiment of the invention.

FIG. 1 is a block diagram of a network according to one embodiment of the invention. The network elements 100A-Z (which are edge network elements in one embodiment of the invention) are coupled to a centralized authentication, authorization and accounting protocol (AAA) server 110 and provide broadband remote access server (B-RAS) capabilities. The network elements 100A-Z may be homogeneous or heterogeneous. The network element 100A includes ports 105A-K, which are coupled to networks 106A and 106B. While networks 106A-B represent any variety of networks, in one embodiment of the invention the network element 100A is an edge network element and: 1) the network 106A includes access network(s) coupled with subscriber end station(s); and 2) the network 106B includes the Internet coupled with other edge network elements coupled with other end stations.

The network elements 100A-Z support a hierarchy of circuits 180, including subscriber circuits 120A-P and parent circuits 130A-M that may aggregate multiple subscriber circuits. The circuit hierarchy 180, the subscriber circuits, and the parent circuits may be implemented using any number of well-known data structures. Each subscriber circuit uniquely identifies within the network element a subscriber session and typically exists for the lifetime of the session. Each subscriber session represents a distinguishable flow of packets communicated between the network element and a subscriber end station (or sometimes customer premise equipment (CPE), such as a residential gateway or modem) using a protocol, such as the point-to-point protocol over another protocol (PP-PoX) (e.g., where X is Ethernet or Asynchronous Transfer Mode (ATM)), a dynamic host configuration protocol (DHCP)/client-less internet protocol service (CLIPS) protocol, etc. These parent circuits may represent physical or logical aggregations of subscriber circuits (e.g., a virtual local area network (VLAN), a private virtual circuit (PVC) (e.g., for Asynchronous Transfer Mode (ATM)), a circuit-group, a channel, a pseudo-wire, a physical port of the network element, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical ports for purposes of bandwidth aggregation and redundancy. Thus, the parent circuits physically or logically encapsulate the subscriber circuits.

The AAA server 110 serves an authentication, authorization and accounting protocol and provides subscriber records that identify subscriber circuit configuration requirements. Authentication is the process of identifying and verifying a subscriber. Authorization determines what a subscriber can do after being authenticated, such as gaining access to certain end station information resources. Accounting is recording user activity. Examples of AAA protocols include Remote Authentication Dial-In User Service (RADIUS), Terminal Access Controller Access Control System (TACACS+), and DIAMETER. Thus, the attributes of the subscriber circuits may be provisioned at the time of initial authorization through the AAA server 110. A subscriber circuit's attributes can also be dynamically managed, viewed, and updated from the AAA server 110 using a change of authorization (e.g., as is implemented by RADIUS) or similar facility.

The AAA server 110 includes subscriber records 140 A-P for the subscriber circuits 120A-P. While there are subscriber records 120A-P for each subscriber, the subscriber circuits 120A-P are typically allocated on one of the network elements 100A-Z when the subscriber connects to that network element, and correspondingly deallocated when that subscriber disconnects.

In addition to including a set of one or more subscriber circuit attributes 150, each of the subscriber records 140A-P may optionally include a set of one or more parent circuit attributes 160. Thus, in one embodiment of the invention, in addition to configuring parent circuits directly on the individual network elements (e.g., through a CLI or vendor-specific graphical user interface (GUI) console), the parent circuits may be configured through the subscriber records. In one embodiment of the invention, one or more parent modifiers or flags denote the set of parent circuit attributes in a subscriber record, and thus specify that those attributes are to be applied to a circuit above the subscriber's circuit in the circuit hierarchy (be it physical or logical). While in one embodiment of the invention each of the subscriber records 140A-P include a set of one or more subscriber circuit attributes 150, alternative embodiments of the invention allow one or more such subscriber records 140A-P to have zero subscriber circuit attributes. A parent circuit is a logical concept, and in one embodiment of the invention the parent circuit for any given subscriber circuit can be changed at any given time using CLI commands. Also, while in one embodiment of the invention there is one parent circuit for a given subscriber circuit (and thus, the set of parent circuit attributes in a subscriber record all refer to the same parent circuit), alternative embodiments of the invention support multiple parent circuits for a single subscriber circuit and different parent circuit attributes in a single subscriber record may refer to different parent circuits of the single subscriber circuit. In one such alternative embodiment the parent circuit to apply a particular attribute would depend implicitly on which feature-set the attribute relates (e.g., some attributes may implicitly apply to a subscriber's encapsulating inner VLAN, others to an outer VLAN, and others to the physical port; a subscriber may be part of multiple, application-specific circuit-groups—such as one for QoS enforcement, another for security/ACL/firewall enforcement, and another for traffic forwarding purposes (say a bridging or CLIPS group)).

The control modules 170 of the network elements 100A-Z control the communication with the AAA server 110 and manage the circuit hierarchy 180.

Figure 2:
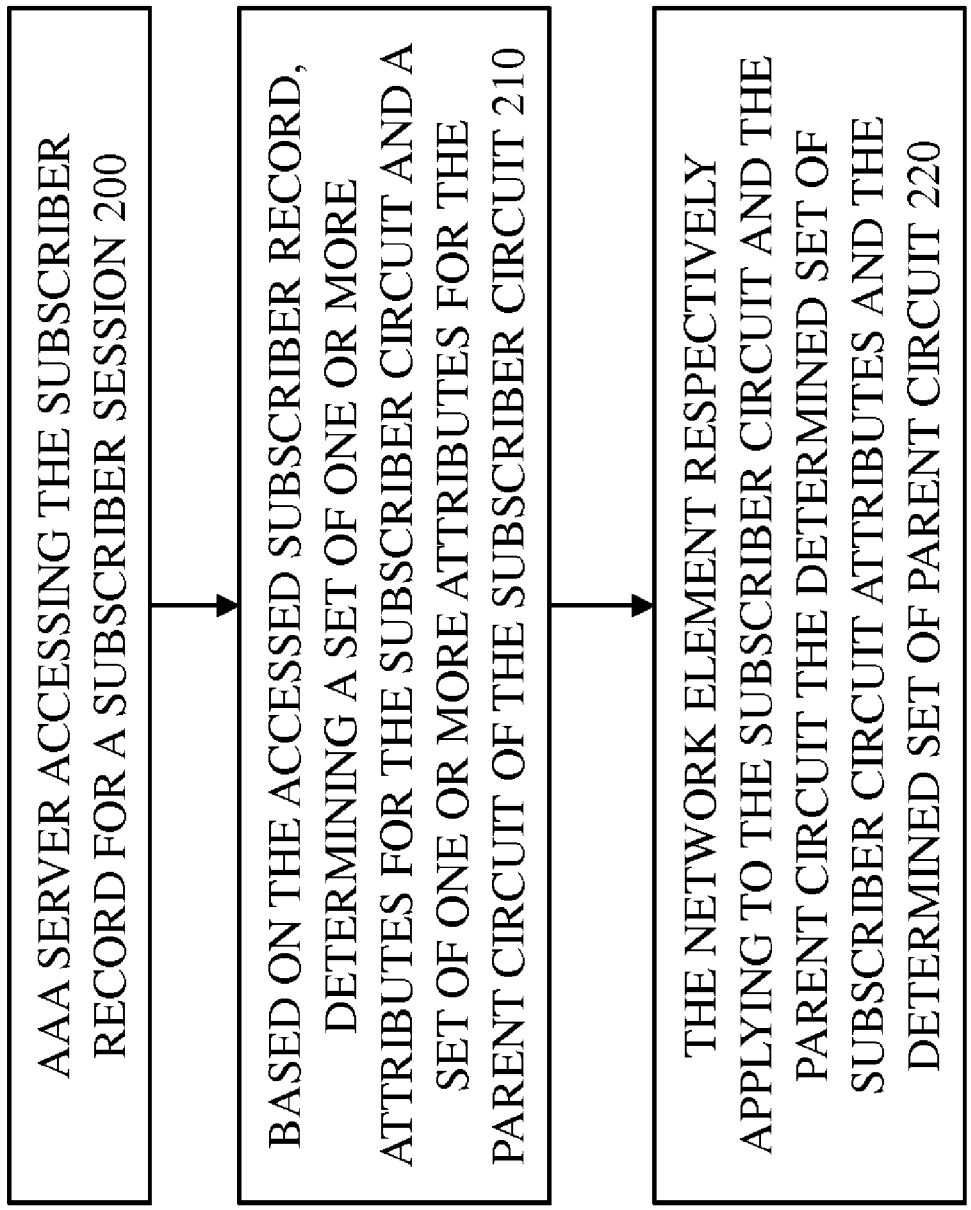
FIG. 2 is a flow diagram illustrating the dynamic configuration of a parent circuit through a subscriber record according to one embodiment of the invention.

FIG. 2 is a flow diagram illustrating the dynamic configuration of a parent circuit through a subscriber record according to one embodiment of the invention. The operations of this flow diagram are described with reference to the exemplary embodiment of FIG. 1. However, it should be understood that the operations of the flow diagram can be performed by embodiments of the invention other than those discussed with reference to FIG. 1, and the embodiments of the invention discussed with reference FIG. 1 can perform operations different than those discussed with reference to the flow diagram of FIG. 2.

In block 200, an AAA server accesses the subscriber record for a subscriber session. With respect to FIG. 1, an authorization event for a given subscriber circuit causes the AAA server 110 to access the subscriber record 140A. For example, the authentication event may include: 1) the network element 100A transmitting to the AAA server 110 an authentication/access-request message according to RFC 2865 responsive to detecting the need for an initial authentication and authorization of the subscriber session; 2) reauthorizing the subscriber circuit (e.g., the network element 100A detecting an SNMP set command identifying the subscriber, an SNMP clear command, or an SNMP re-authentication command); or 3) a change of authorization (e.g., a RADIUS change of authorization (CoA) request message transmitted from the AAA server to the network element 100A). From block 200, control passes to block 210.

As shown in block 210, a set of one or more attributes for the subscriber circuit and a set of one or more attributes for the parent circuit of the subscriber circuit are determined based on the accessed subscriber record. In one embodiment of the invention, this simply refers to accessing the set of subscriber and parent circuit attributes from the subscriber record, and transmitting them from the AAA server 110 to the network element 100A (e.g., in a RADIUS reply to an access-request, or in a CoA request) for application. However, in an alternative embodiment of the invention, block 210 includes a conflict resolution operation to resolve conflicts because different subscriber circuits with the same parent circuit may specify differing values for the same parent circuit attribute. The conflict resolution operation determines the set of parent circuit attributes to be applied. This conflict resolution operation is discussed later herein. Further, while in one embodiment of the invention the AAA server 110 transmits the set of parent circuit attributes from the accessed subscriber record and the network element 100A performs the conflict resolution to determine the set of parent circuits attributes to be applied, in alternative embodiments of the invention the conflict resolution may be handled differently (this conflict resolution operation is performed by a modified version of the AAA server 110, and the resulting set of parent circuit attributes are transmitted along with the set of subscriber circuit attributes to the network element 100A; the conflict resolution operation is spread across the network elements 100A-Z and a modified version of the AAA server 110). From block 210, control passes to block 220.

In block 220, the network element respectively applies to the subscriber circuit and the parent circuit the set of subscriber circuit attributes and the set of parent circuit attributes determined in block 210. By way of specific example, assume that the set of parent circuit attributes includes a QoS rate adjustment. In one embodiment of the invention, the network element would validate the subscriber circuit and its flags; determine the parent circuit; calculate a new QoS rate based on the parent circuit attribute and any other applicable information; and apply the new circuit rate to the parent circuit.

Entities that must provision subscriber circuits are accustomed to provisioning them through an AAA server. As such, the invention has the advantage of provisioning parent circuits through the same AAA server and records, thus providing a centralized point to manage relatively large networks of homogeneous and/or heterogeneous devices. It is especially useful in situations where the configuration of the parent circuits must be replicated and synchronized across multiple devices, because it requires less effort than directly doing so on each network element and because it is less error prone. Thus, the invention allows for more of a network element's capabilities to be provisioned via a centralized, authorization based configuration. This, in effect, makes management easier and more robust, and allows for configurations that affect all of a subscriber's traffic and/or that affect multiple subscribers' traffic through a single subscriber's subscriber record. Further, it allows for the automated configuration of attributes in multiple levels of the circuit hierarchy through an AAA server via a single subscriber record. This is also particularly useful when the requirements of services provisioned on subscriber circuits must affect the operation of circuits above it in the hierarchy.

To explain automated configuration by way of example, assume hierarchical QoS in the context of a triple play. Specifically, assume there is a VLAN (e.g., a CVLAN modeling a DSL line to an end-user-customer) over which at least three subscriber sessions may be carried. The three subscriber sessions are for a workstation (data traffic over PPPoE), a set top box (IPTV video over PPPoE or IPoE), and a voice over internet protocol (VOIP over IPoE or CLIPS) phone. The network element would therefore potentially have up to three subscriber circuits for these sessions, each of which has the same parent circuit (the VLAN). Thus, the subscriber circuits represent network connections between the subscriber end stations and the network element (e.g., the network element 100A); and the parent circuit represents a network connection between the network element (e.g., network element 100A) and another network element (situated between the end stations and the network element 100A; e.g., a digital subscriber line access multiplexer (DSLAM)) that aggregates and encapsulates the subscriber sessions.

Those of the parent circuit's attributes that were required for practical set up of the VLAN (e.g., the VLAN's identifier and encaps) were statically configured (perhaps through a CLI), while the others of the parent circuit's attributes (e.g., access control list, quality of service (QoS) rate limits, etc.) may or may not have been statically configured. Also, assume that the default QoS rate limit for the VLAN circuit which represents the aggregation of all three potential services is 500 kbps.

The network element can apply specific attributes to each of these subscriber circuit attributes to the corresponding subscriber circuit upon authorization of that corresponding subscriber circuit. However, by way of example, the authorization of the one or more subscriber sessions could not have been used to modify the rate-limit or other QoS attribute of the aggregate VLAN circuit, for example in response to the IPTV service being enabled or coming into operation. Rather, it would require direct configuration at the network element (e.g., through CLI) if a corresponding rate-limit increase to 750 kbps was needed for the VLAN to accommodate the increased overall bandwidth required by the presence of the service represented by the child subscriber circuit. However, the inclusion of parent circuit attributes in the subscriber records and dynamic application of the same allows for such dynamic/automated modification of the parent circuit; in effect, automating the modification at both the subscriber circuit and parent circuit levels. Further, such application of parent circuit attributes to the parent circuit may be applied both when a subscriber circuit is initially authenticated and authorized, or responsive to a change of authorization (e.g., via a RADIUS change of authorization (CoA)) to a subscriber circuit already in place.

The previously described conflict resolution operation may be performed different ways by different embodiments of the invention. In one embodiment of the invention in which the conflict resolution is performed on the network element, the network element maintains a data structure that stores the various subscriber/parent circuit attributes received for currently active subscriber circuits (those that have not been terminated). This list is used to resolve any conflicts. For example, the conflict resolution operation may stick with the first set of parent circuit attributes applied, and thus ignore sets of parent circuit attributes from subsequently accessed subscriber records. As another example, the last attribute received for the parent from the AAA server is applied in preference to any that have come before. As another example, the set of parent circuit attributes in the subscriber records may specify increment/decrement values, and the set of parent circuit attributes applied by the network element may be a result of adding by the values when a subscriber circuit is provisioned and decrementing by the values when the subscriber circuit is de-provisioned. As yet another example, the subscriber records for sibling subscriber circuits may each have a priority value associated with a given parent circuit attribute. When any one of these sibling subscriber records is accessed for authentication, the value of the attribute from the one of the sibling subscriber records with the highest priority is chosen (thus, the network element looks at all the attribute value pairs received for a common parent and applies the one with the highest assigned priority value). As another example, the parent circuit attribute is treated as a "high water mark" threshold (or peak value), in which the highest value received remains the applied value until either it is replaced by a higher value or removed. As yet another example, the parent circuit attribute is treated as a "low water mark" threshold (or trough value), in which the lowest value received remains the applied value until either it is replaced by a higher value or removed. Of course, certain embodiments of the invention may support different ones of the above for different parent circuit attributes in a fixed or configurable manner.

In some embodiments of the invention, criteria are used for removing parent circuit attributes in the network element. For example, they could be removed when the child subscriber circuit or circuits that caused them to be applied is terminated (and thus, they revert back to any statically configured values); they could be sticky, and thus persist even after the child subscriber circuit or circuits that caused them to be applied is terminated.

In one embodiment of the invention, vendor specific attributes (VSAs) of the AAA server are used to implement the parent circuit attributes. By way of specific example, in one embodiment the RADIUS VSA 196 (Dynamic-QoS-Param) and the policy-refresh command are enhanced with an optional parent keyword. For example, "attribute [parent] [remove]" and "policy-refresh {username subscriber|agent-remote-id id} attribute name {value} [parent] [remove]." Where attribute name specifies a dynamic quality of service (QoS) parameter (Dynamic-QoS-Param). The parent keyword is optional, and is entered to apply the modification of a dynamic-qos-param attribute to the parent circuit of the subscriber session instead of the subscriber session. The policy-refresh command is used to modify in real time a subscriber policy attribute in the specified subscriber record. The remove keyword is optional and is used to remove a dynamic parameter and revert the QoS parameter to the default value. Also, username subscriber is a fully qualified subscriber name, in the format sub-name@ctx-name, for which the attribute is to be modified; agent-remote-id id is another property by which a subscriber circuit can be uniquely specified, for which the attribute is to be modified; {value} is the new value. An example of the policy refresh command with the parent keyword is: [local]sneezy#policy-refresh username foo@local attribute Dynamic-QoS-Param meter-circuit-rate rate-absolute 10000 parent. In this example, foo is the user name; local is the context; foo@local is the fully qualified username; and meter-circuit-rate is the Dynamic QoS parameter 10000—rate applied (10,000 Kbps=10 Mbps).

Some network elements support the configuration of multiple contexts. As used herein, each context includes one or more instances of a virtual network element (e.g., a virtual router, a virtual bridge (such as a virtual switch instance)). Each context typically shares system resources (e.g., memory, processing cycles, etc.) with other contexts configured on the network element, yet is independently administrable. For example, in the case of multiple virtual routers, each of the virtual routers may share system resources but is separated from the other virtual routers regarding its management domain, AAA (authentication, authorization, and accounting) name space, IP address, and routing database(s). Multiple contexts may be employed in an edge network element to provide direct network access and/or different classes of services for subscribers of service and/or content providers.

Within certain network elements, multiple "interfaces" may be configured. As used herein, each interface is a logical entity, typically configured as part of a context, which provides higher-layer protocol and service information (e.g., Layer 3 addressing) and is independent of physical ports and circuits. The subscriber records in the AAA server provide, as part of the subscriber configuration requirements (the aforementioned subscriber and optional parent circuit attributers), to which context (e.g., which of the virtual routers) the corresponding subscribers should be bound within the network element. As used herein, a binding forms an association between a physical entity (e.g., port, channel, etc.) or a logical entity (e.g., circuit) and a context's interface over which network protocols (e.g., routing protocols, bridging protocols) are configured for that context. Subscriber data flows on the physical entity when some higher-layer protocol interface is configured and associated with that physical entity.

By way of a summary example, subscriber end stations may be coupled (e.g., through an access network) through a multiple services edge network element (supporting multiple contexts (e.g., multiple virtual routers), interfaces, and AAA processing) coupled to core network elements coupled to other end stations (e.g., server end stations of service/content providers). Further, AAA processing is performed to identify the subscriber record for a subscriber, which identifies, in addition to those items previously discussed, one or more contexts in the network element to which that subscriber's traffic should be bound.

In one embodiment of the invention, network elements 100A-Z include a control plane (of one or more control cards) and a forwarding plane (of one or more line cards). The control plane includes the control modules 170, and the control modules 170 include: 1) an AAA protocol module that bi-directionally communicates with the specific protocol of the AAA server 110 (there would be one AAA protocol module per AAA protocol supported); 2) a generic AAA module that bi-directionally communicates with the AAA protocol module(s), maintains a list of the attributes of the subscribers/parent circuits, and directs the appropriate attributes to the appropriate feature application modules; 3) feature application modules (specific to different attributes) that receive from the generic AAA module the appropriate attributes, maintain the circuit hierarchy 180, and cause the forwarding plane to apply the attributes, and maintain a list of the applied parent attributes. While in one embodiment of the invention the conflict resolution operation is part of the AAA generic module, alternative embodiments of the invention may be partitioned differently (e.g., the conflict resolution module may distributed across the feature application modules).

Previously, an example of attributes for a VLAN was described. By way of further example, one embodiment of the invention supports the following parent circuits which have the following attributes (in addition to encapsulated protocols and service bindings) that are not configured through parent attributes (e.g., they are required for practical set up and thus, statically configured through, for example, CLI): 1) port: framing, link-speed; 2) link aggregation group: constituent links; 3) channel: channel id; 4) 802.1q VLAN: VLAN identifier(s); 5) ATM PVC: PVC identifiers (vpi and vci); and 6) pseudo-wire: pseudo-wire specific encapsulation and identifying information. Further, this embodiment of the invention also supports circuit-group, but these do not require any such attributes. In addition, the feature application modules include the following (listed in the format <feature module name> (example attributes) <circuit types to which applicable>): 1) subscriber manager (examples Client-DNS-Pri, Context-Name, Ip-Address-Pool-Name) subscribers; 2) Bridging (Bridge-Group, BG-Aging-Time) all except circuit-group; 3) QoS (Qos-Rate-Inbound, Qos-Rate-Outbound, Qos-Policy-Metering, Dynamic-QoS-Param) all; 4) Minoring and redirect service (Forward-Policy) all; 5) Tunnel Manager (L2TP, etc.: Tunnel-Domain, Tunnel-Session-Auth, Tunnel-Group) all except circuit-group; 6) Multicast manager (Mcast-Send, Mcast-Receive, Igmp-Service-Profile-Name) all except circuit-group; 7) ACLMgr (ACL-Definition, Dynamic-Policy-Filter) all; 8) DHCP (DHCP-Vendor-Encap-Options) Ethernet port and 802.1q VLANs; and 9) Lawful Intercept (LI-Id, LI-Action) all except circuit-group. Of course, alternative embodiments of the invention may support more, less, and/or different parent circuits, dynamically configured parent circuit attributes, feature application modules, etc.

The techniques described herein can be implemented using code and data stored and executed on an electronic device, such as a network element and an AAA server. Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, zero or more user input/output devices (e.g., a keyboard, a touch-screen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Alternative Embodiments

While embodiments of the invention are described in which subscriber circuits and parent circuits are utilized, alternative embodiments of the invention may in addition or alternatively operate on any dynamically authorized circuit and any statically configured circuit with a specifiable relationship with the dynamically authorized circuit.

Also, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for dynamically configuring attributes of circuits on a network element through an authentication, authorization, and accounting (AAA) server, the method comprising the steps of:
   receiving at the network element from the AAA server a message with a set of one or more subscriber circuit attributes and a set of one or more parent circuit attributes accessed from a single subscriber record stored in the AAA server; and
   applying at the network element attributes to a parent circuit of a subscriber circuit based on the set of parent circuit attributes, wherein the subscriber circuit uniquely identifies within the network element a subscriber session, wherein the subscriber session represents a distinguishable flow of packets being communicated between the network element and a subscriber end station or customer premise equipment using a protocol, and wherein the parent circuit aggregates the subscriber circuit with one or more other subscriber circuits, whereby the parent circuit is dynamically configured through the single subscriber record.

2. The method of claim 1, the method further comprising the step of:
   applying the set of subscriber circuit attributes to the subscriber circuit.

3. The method of claim 1 further comprising the initial steps of:
   detecting in the network element an authentication event for the subscriber circuit; and
   transmitting from the network element to the AAA server a request message responsive to said step of detecting.

4. The method of claim 3, wherein the authentication event is one of initially authenticating the subscriber circuit and reauthenticating the subscriber circuit.

5. The method of claim 1, wherein said step of applying includes the step of resolving one or more conflicts between the set of parent circuits attributes in the subscriber record and one or more other sets of parent circuit attributes to determine the attributes to be applied to the parent circuit.

6. The method of claim 5, wherein the step of resolving conflicts includes the step of selecting, for a same parent circuit attribute, between differing values specified by the subscriber record and a second subscriber record, wherein the value for the same parent circuit attribute from the second subscriber record was previously transmitted to the network element by the AAA server responsive to accessing the second subscriber record for another subscriber session.

7. The method of claim 6, wherein the step of selecting includes the step of selecting the one of the differing values specified by the one of the subscriber records having a highest priority value for that same parent circuit attribute, wherein each of the subscriber records includes a different priority value for that same parent circuit attribute.

8. The method of claim 1, wherein the parent circuit represents one or more of a virtual local area network, a private virtual circuit, a circuit-group, a channel, a pseudo-wire, a port, and a link aggregation group.

9. The method of claim 1, wherein the subscriber circuit represents one of the point-to-point protocol over another protocol (PPPoX) and a dynamic host configuration protocol (DHCP)/client-less internet protocol service (CLIPS) protocol.

10. The method of claim 1 further comprising:
performing the steps of receiving and applying in a second network element, wherein by the configuration of the parent circuit is replicated and synchronized across the two network elements through the single subscriber record.

11. A network element, to be coupled to an authentication, authorization, and accounting (AAA) server, for dynamically configuring attributes of circuits, said network element comprising:
a set of one or more ports to receive subscriber sessions, wherein each of the subscriber sessions represents a distinguishable flow of packets being communicated between the network element and a subscriber end station or customer premise equipment using a protocol;
a plurality of control modules to perform the following for each of a plurality of subscriber sessions:
receive from the AAA server a set of one or more subscriber circuit attributes and a set of one or more parent circuit attributes both from a subscriber record stored in the AAA server, and
apply attributes, based on the set of subscriber circuit attributes and the set of parent circuit attributes, to a subscriber circuit for that subscriber session and a parent circuit of that subscriber circuit;
wherein each of the subscriber circuits uniquely identifies within the network element one of the subscriber sessions;
wherein at least one of the parent circuits represents an aggregation of two or more of the subscriber circuits; and
whereby the sets of parent circuit attributes for the parent circuits are dynamically configured through the subscriber records on the AAA server responsive to authorization events for the subscriber sessions.

12. The apparatus of claim 11, wherein the authorization events include initially authenticating the subscriber circuits and reauthenticating at least one of the subscriber circuits.

13. The apparatus of claim 11, wherein the protocols for the different subscriber sessions include a point-to-point protocol over another protocol (PPPoX) and a dynamic host configuration protocol (DHCP)/client-less internet protocol service (CLIPS) protocol.

14. The apparatus of claim 11, wherein the parent circuits represent one or more of a virtual local area network, a private virtual circuit, a circuit-group, a channel, a pseudo-wire, port, and a link aggregation group.

15. The apparatus of claim 11, wherein the plurality of control modules are also to perform the following for each of the plurality of subscriber sessions:
resolve conflicts between differing values specified by two different ones of the subscriber records for a same one of the parent circuit attributes for a same one of the parent circuits to determine the attributes to be applied.

16. A system for dynamically configuring attributes of circuits on network elements through authentication, authorization, and accounting (AAA) comprising:
an AAA server having stored therein subscriber records that each include both a set of one or more subscriber circuit attributes and a set of one or more parent circuit attributes;
a plurality of network elements coupled to the AAA server to receive from the appropriate ones of the subscriber records the sets of subscriber circuit attributes and the sets of parent circuit attributes responsive to authorization events for subscriber sessions, wherein each of the plurality of network elements includes:
a plurality of ports coupled to subscriber end stations and customer premise equipment,
data structures representing subscriber circuits and parent circuits of the subscriber circuits, wherein each of the subscriber circuits uniquely identifies within the network element one of the subscriber sessions, wherein each of the subscriber sessions represents a distinguishable flow of packets being communicated between the network element and one of the subscriber end stations or customer premise equipment using a protocol; wherein at least one of the parent circuits represents an aggregation of two or more of the subscriber circuits, and
a plurality of control modules coupled to maintain the data structures and to apply attributes based on the received sets of subscriber circuit attributes and the received sets of parent circuit attributes respectively to the appropriate ones of the subscriber circuits and the parent circuits; and
whereby the configurations of the parent circuits are replicated and synchronized across the plurality of network elements through the subscriber records.

17. The system of claim 16, wherein the authorization events include initially authenticating the subscriber circuits and reauthenticating at least one of the subscriber circuits.

18. The system of claim 16, wherein the protocols for the different subscriber sessions include a point-to-point protocol over another protocol (PPPoX) and a dynamic host configuration protocol (DHCP)/client-less internet protocol service (CLIPS) protocol.

19. The system of claim 16, wherein the parent circuits represent one or more of a virtual local area network, a private virtual circuit, a circuit-group, a channel, a pseudo-wire, port, and a link aggregation group.

20. The system of claim 16, wherein the plurality of control modules are also to resolve conflicts between differing values specified by two different ones of the subscriber records for a same one of the parent circuit attributes for a same one of the parent circuits to determine the attribute to be applied.

* * * * *

UNITED STATES PATENT AND TRADEMARK OFFICE
CERTIFICATE OF CORRECTION

| | |
|---|---|
| PATENT NO. | : 8,243,602 B2 |
| APPLICATION NO. | : 12/512928 |
| DATED | : August 14, 2012 |
| INVENTOR(S) | : Chinnaswamy et al. |

It is certified that error appears in the above-identified patent and that said Letters Patent is hereby corrected as shown below:

In Column 9, Lines 40-41, delete "Minoring" and insert -- Mirroring --, therefor.

Signed and Sealed this
Thirteenth Day of November, 2012

David J. Kappos
*Director of the United States Patent and Trademark Office*